US010099519B2

(12) United States Patent
LeMense et al.

(10) Patent No.: US 10,099,519 B2
(45) Date of Patent: Oct. 16, 2018

(54) SYSTEMS AND METHODS USING A REFERENCE MARKER

(71) Applicant: Infineon Technologies AG, Neubiberg (DE)

(72) Inventors: Thomas LeMense, Farmington, MI (US); Thomas Lange, Munich (DE); Maximilian Werner, Mickhausen (DE)

(73) Assignee: Infineon Technologies AG, Neubiberg (DE)

( * ) Notice: Subject to any disclaimer, the term of this patent is extended or adjusted under 35 U.S.C. 154(b) by 421 days.

(21) Appl. No.: 14/676,217

(22) Filed: Apr. 1, 2015

(65) Prior Publication Data

US 2016/0288596 A1 Oct. 6, 2016

(51) Int. Cl.
*B60C 23/04* (2006.01)

(52) U.S. Cl.
CPC ...... *B60C 23/0416* (2013.01); *B60C 23/0457* (2013.01); *B60C 23/0459* (2013.01); *B60C 23/0462* (2013.01); *B60C 23/0488* (2013.01); *B60C 23/0489* (2013.01)

(58) Field of Classification Search
CPC ............ B60C 23/0457; B60C 23/0459; B60C 23/0462
See application file for complete search history.

(56) References Cited

U.S. PATENT DOCUMENTS 5,802,451 A 9/1998 Adachi et al.
6,885,293 B2 4/2005 Okumura
8,686,847 B2 4/2014 Lickfelt et al.
8,776,589 B1 7/2014 Brown
8,880,286 B2 11/2014 Fink
2003/0038716 A1 2/2003 Piesinger
2012/0235808 A1* 9/2012 Kanenari ............ B60C 23/0494 340/445
2014/0195104 A1 7/2014 Hammerschmidt
2015/0165835 A1* 6/2015 Peine ................. B60C 23/0416 340/447

FOREIGN PATENT DOCUMENTS

| | | | |
|---|---|---|---|
| CN | 102452282 | A | 5/2012 |
| CN | 102666147 | A | 9/2012 |
| CN | 102862449 | A | 1/2013 |
| CN | 103963575 | A | 8/2014 |
| DE | 102004039837 | A1 | 3/2006 |
| JP | 2010122168 | A | 6/2010 |

* cited by examiner

*Primary Examiner* — Paul West
(74) *Attorney, Agent, or Firm* — Eschweiler & Potashnik, LLC

(57) ABSTRACT

A tire pressure monitor sensor is disclosed. The sensor includes a wireless transmitter and a processing unit. The processing unit provides a time trigger signal within a measurement period and triggers a wireless transmission of a reference signal indicating an occurrence of the time trigger signal to a remote unit. The tire pressure monitor sensor is configured to derive, based on a plurality of acceleration measurement samples within the measurement period, information indicting at least one rotation property of a tire. The tire pressure monitor sensor is further configured to wirelessly transmit the derived information to a remote unit separate from the reference signal.

20 Claims, 5 Drawing Sheets

SYSTEMS AND METHODS USING A REFERENCE MARKER

BACKGROUND

Pressure monitoring systems are used in many applications. For example, a tire pressure monitoring system (TPMS) often measures tire pressure for a vehicle and notifies a vehicle's operator if the measured tire pressure falls outside of an ideal tire pressure range. Thus, a TPMS improves safety for the vehicle operator and for surrounding vehicle operators.

DETAILED DESCRIPTION

Figure 1:
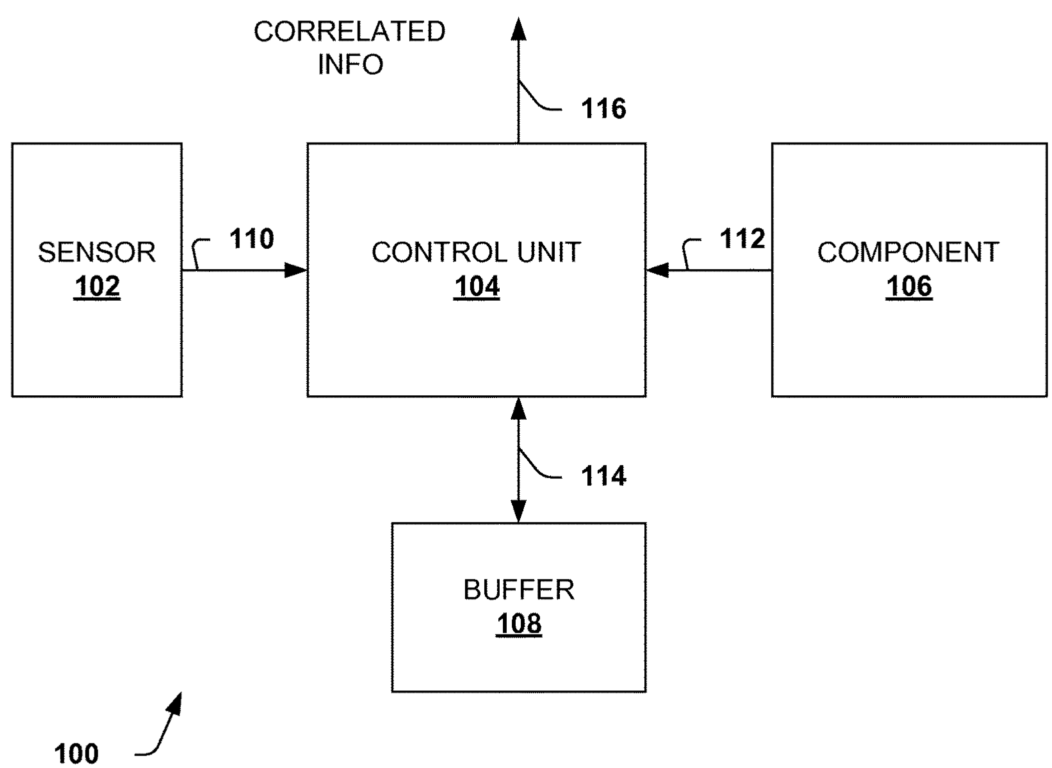
FIG. 1 is a diagram illustrating a system for correlating sensor information using reduced buffering.

The present invention will now be described with reference to the attached drawing figures, wherein like reference numerals are used to refer to like elements throughout, and wherein the illustrated structures and devices are not necessarily drawn to scale.

Embodiments herein described relate to tire pressure monitoring systems (TPMS) however it is to be noted that the use is not restricted thereto.

In TPMS, each wheel module typically includes a pressure sensor, control logic such as a microcontroller, a power source such as a battery, and a radio frequency (RF) transmitter that communicates pressure readings from the pressure sensor to central TPMS receiver mounted elsewhere in the vehicle. Wheel modules typically also comprise an acceleration sensor. TPMS wheel modules typically include a unique identification code in the RF frame so that the central TPMS receiver can identify one wheel module from another, as well as distinguish wheel modules of one vehicle from those of another when vehicles are close enough that signals from one may reach another.

When a low pressure situation is detected, drivers generally want to know which tire, e.g. the tire mounted right front, is low, rather than simply that one of the tires is low which often requires each to be checked in order to determine which tire actually needs attention. Effective and efficient localization is an on-going challenge in TPMS because tire locations may be changed. Embodiments herein describe a concept of localization using a correlation between a rotation property information derived from measurements by a tire pressure monitor sensor (mounted at or within a tire) with information based on measurements of respective rotations of the wheel axes on which the tires are mounted.

Typically, each of the tires mounted in a car are at least partially rotating differently, for example when the car drives along a curve or due to different wears of the tire etc. Since the location (e.g. front right) of each of the wheel speed sensors mounted in a car to sense rotation of the wheel axes is known to a control unit, a correlation of the data related to the rotation of the wheel axle with derived rotation property information from a respective tire pressure monitor sensor allows locating the tire pressure monitor sensor.

FIG. 1 is a diagram illustrating a system 100 for correlating sensor information such as a tire pressure monitoring sensor with an information stream such as an information stream related to rotation data of a wheel axle on which a tire is mounted. An information stream from a component such as a wheel speed sensor for sensing the rotation of the wheel axle or a control unit processing wheel speed sensor information is correlated with the sensor information. In embodiments, only a specific portion of the information stream is used for the correlation. The specific portion is determined at least in part by a time reference marker signal (e.g. reference frame) transmitted by the sensor ahead of the derived information. The above concept avoids transmitting the derived information and specific time reference data after finishing the processing to obtain the derived information which allows reducing buffer size at a control unit.

The system 100 includes a sensor 102, a control unit 104, a component 106 and a buffer 108. The system 100 can be used for vehicle applications and the like.

The sensor 102 is configured to measure information, derive information from the measured information and convey the measured information and derived information as sensor information 110. In one example, the sensor 102 includes a wireless transmitter and a processing unit. The sensor 102 can be configured to measure and/or derive a variety of properties and/or conditions, for example by using the accelerometer. The sensor 102 is configured to measure information including, but not limited to, pressure, single axis acceleration, one or more axis acceleration and the like.

In embodiments, the sensor 102 is configured to derive information from the measured information that relates to rotation of the tire, such as an angular phase position of the tire and/or a rotational frequency of the tire. An angular phase indicates the tire rotation angle with respect to a predefined first rotation position of the tire. For example, the predefined first rotation position may be a position at which the sensor mounted on the tire is at a bottom position, i.e. closest to the ground, or a position at which the sensor is at a top position.

A duration of time, also referred to as a measurement period, is required for the sensor to derive the information. For example in some embodiments acceleration measurements are sampled at the sensor for an angular position sensing (APS).

To provide a time reference for the angular position, the sensor 102 is configured to determine a time trigger based on a trigger event, such as one or more measurement samples, a time interval and the like. The time trigger may depend upon measurement of a reference condition, such as a measurement that exceeds a threshold value. For example, the TPMS sensor will typically 'decide' or wake up to start to do Angular Position Sensing measurements for determining an angular position for some fixed number of attempts after it first detects it is rolling after some long duration of being stationary, for example, if a car is started after parked for a longer time. The TPMS sensors are periodically checking the accelerometer to detect motion if the radial or tangential acceleration or both exceed a threshold. Each of the respective sensors determines on its own that the car is rolling by monitoring the acceleration and each of the sensors will thereafter start its APS measurement. The APS measurement includes a sampling period in which a series of subsequent measurement samples of the acceleration is performed. The series of subsequent measurement samples may include a predetermined number of measurement samples, e.g. 21 APS measurement samples.

The time trigger corresponds to a reference time for the calculation or the derived information in the sensor. Thus, in embodiments, an angular phase or an angular rotation frequency calculated by an algorithm in the sensor based on the measurement samples references to the time of the time trigger. In some embodiments, one of the measurement samples in the sequence of measurement samples may be associated with the time trigger and is referred to as the reference sample. The point in time at which the time trigger occurs may in some embodiments correspond to the actual time when the reference sample is measured.

In some embodiments, the time trigger may not directly correspond to a time of a measurement sample but its time is predetermined with respect to the measurement samples. The time trigger may set the time reference to a predetermined point in time between two samples, e.g. the middle of the time period between two measurement samples.

The sensor 102 starts to generate and send a reference frame or signal upon or close to the occurrence of the time trigger. In some embodiments, the generation of the reference frame may be started prior to the occurrence of the time trigger which avoids further delay when the time trigger occurs. Since the occurrence of the time trigger is predetermined, the starting of the generation of the reference frame and the sending of the reference frame can be synchronized. The transmitted reference frame acts similar to a beacon to indicate to the control unit the time reference used for the calculation of the derived information in the sensor. In one example, the reference frame includes a predefined code to indicate the occurrence of the time trigger.

Some small delay is added due to the time required for generating the reference frame and transmitting the reference frame. This delay is short compared to the processing time to complete the measurement and derive the information in the sensor. Furthermore, other than the processing time, this time delay is typically approximately the same for all sensors. Therefore, the time delay adds a constant error to the derived information which however is not influencing the correlation. It is noted that the reference frame therefore is not required to include time information or a time stamp. In order to identify a frame as the reference frame, a predefined pattern of bits coded into the frame or any other predefined code which allows identifying the transmitted frame as a reference frame may be used. In addition the frame includes sensor ID information such as bits indicating a predefined ID of the sensor. After generating the reference frame, the sensor 102 may start or, in case calculation has started before, complete the calculation of the derived information based at least partially on the reference sample and/or the other measurement samples. Each of the sensor may have a respective algorithm implemented to derive the information based on the measurement samples. In general, the derived information includes rotation information such as an angle phase of the tire and/or a rotation frequency of the tire. The derived information may be determined based on the detection of a +/−1 g modulation on the acceleration measurement samples in the course of a tire rotation, where g is the earth's gravity constant, the algorithms used may be adapted to Once derived, a data frame is sent that includes the derived information or property, such as a rotation property. It is again noted that the data frame is not required to include time or a time stamp. Both the reference frame and the data frame are part of the sensor information 110.

It is noted that the reference frame and the data frame are data transmission units or data packets used for communication. In addition to the above, the reference frame and the data frame typically include synchronization features, header information and the like.

The sensor information 110 is typically transmitted by a wireless transmission technique, such as a radio frequency (RF) transmission. In one example, the sensor information 110 is provided from the sensor 102 by a transmitter and received at the control unit 104 by a receiver.

The component 106 generally monitors and/or controls a subsystem, not shown. In one example, the component 106 monitors and controls an anti-lock breaking system (ABS). In another example, the component 106 monitors and/or controls an electronic stability control (ESC) system. The component 106 generates or provides an information stream 112. The stream 112 can include information from other sensors, subsystems and the like. The stream 112 can be provided via a bus, vehicle system bus or other suitable mechanism.

The control unit 104, also referred to as a remote unit, receives the sensor information 110 and the information stream 112 and generates correlated information 116 therefrom. The control unit 104 is remote from the sensor 102. The control unit 104 selectively stores a portion of the stream 112 from the component 106 into a buffer 108 upon receipt of the reference frame from the sensor. When storing the information, the control unit 104 is configured to store a portion of the information for a selected duration, such as 1 mili-second (ms). In one embodiment, the stream may be sampled by taking one sample at a time nearest to the reference frame. In one embodiment, a small number of samples near in time to the reference frame may be recorded. In some embodiments, one or more samples of the stream may be processed, e.g. by averaging or interpolation, in order to account that the reference frame may arrive between two samples in order to provide the information used for correlation. The portion is stored in the buffer 108, in this example. However, other mechanisms for storing this data are contemplated. The buffer 108 is a relatively small memory device coupled to the control unit 104.

After some time, the data frame, which has the derived information, is received. Upon receiving the derived information, the control unit 104 retrieves the stored portion 114 from the buffer 108. It is noted that a time stamp or time reference is not needed. Both the derived information and the stored portion 114 are coincident with the instant of the time trigger. Thus, the control unit 104 generates correlated information 116 based on the stored portion 114 and the derived information without need for time information. The correlated information 116 is then provided via a suitable mechanism, such as a bus, vehicle bus, and the like. The correlated information 116 can in one embodiment include tire location information. In other embodiments, the correlated information 116 may include other information such as wheel rotational speed, indirect air pressure and the like.

The buffer 108 is configured to store and provide information, including the stored portion 114, upon request. The buffer 108 can be used to store other information in addition to the stored portion 114. The buffer 108 has a buffer size selected to be large enough to maintain the stored portion 114. The buffer size is typically less than other systems that continuously store the information stream.

It is noted that other approaches, including those approaches that do not use a reference frame as a time mark, to generate correlated information require a larger buffer and more processing time. Such systems continuously store information streams in a larger buffer. Then, these stored streams need to be searched in order to identify relevant information from the appropriate time in order to generate the correlated information.

As stated above, the component 106 provides the information stream 112. Additionally, the component 106 may receive the correlated information 116 and/or other information from the control unit 104, for example, for control and calibration purposes.

Thus, the control unit 104, also referred to as the remote unit, generates the correlated information 116 based on the stored portion 114 and derived information from the sensor information 110. The control unit 104 can utilize one or more techniques, such as tables, algorithms and the like to generate the correlated information 116. The correlated information 116 can include, for example, position information of the sensor 102, updates for the component 106, and the like.

The correlated information 116 is information generated based on the stored portion 114 and the derived information from the sensor. Thus, the correlated information 116 is based on information from the component 106 at about the time of the derived information. For example, if the component 106 is an anti-lock brake system and the sensor is a tire pressure sensor, the correlated information includes information from the anti-lock brake system and the tire pressure sensor at that time of the time trigger. The correlated information can be used, for example, to determine a vehicle localization/wheel position such as front left, front right, rear left and rear right.

Figure 2:
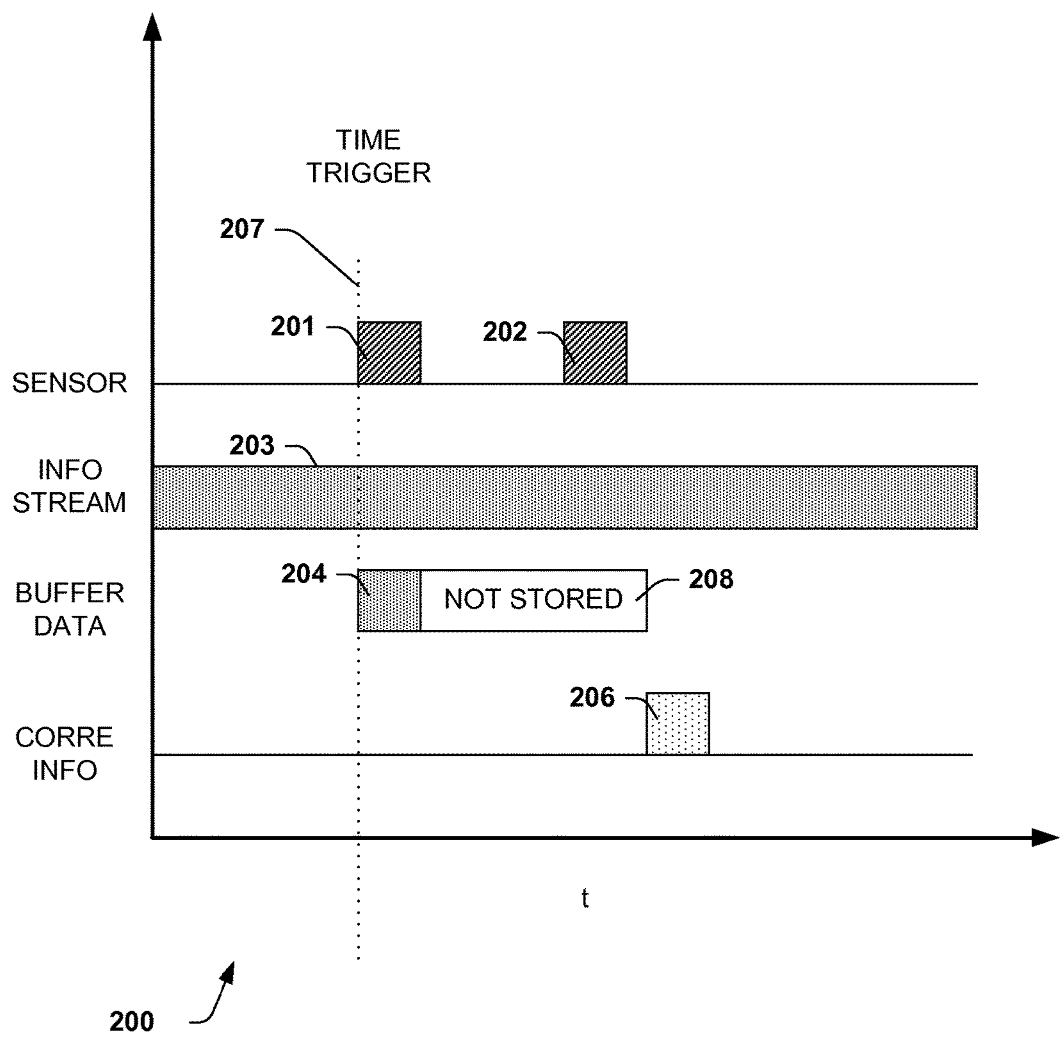
FIG. 2 is a graph depicting storage and transfer of information between components of a correlation system.

FIG. 2 is a graph 200 depicting storage and transfer of information between components of a correlation system, such as the system 100. For ease of understanding, the system components are described in the context of a vehicle system using a TPMS as a sensor. However, it is appreciated that other component types and systems could be used.

An x-axis depicts time (t) and a y-axis depicts/represents signal values or data. Sensor information is depicted along a line labeled as SENSOR. The sensor information is provided by a sensor, such as the sensor 102 described above. In this example, the sensor is a TPMS sensor and obtains acceleration measurements or samples.

At a first time point 207, referred to as the time trigger, the sensor obtains a measurement that exceeds a threshold value or meets another criterion. This measurement is a reference measurement or sample. Additionally, the sensor generates and transmits a reference frame 201. The sensor uses the reference measurement, and in some cases additional measurement prior to or after the reference measurement, or both, to derive one or more values, such as a wheel rotational frequency and angular position. The angular position is also referred to as an angular phase. A suitable algorithm, table and/or the like can be used to derive the one or more values. It is noted that the sensor is not required to measure, record or transmit time values as is the case in other approaches.

Once the one or more derived values are determined at a second time point, the one or more values are sent as a data frame 202 as part of the sensor information. The period of time between the time trigger and the determination of the one or more derived values is referred to as the processing time. This processing time can vary upon implementation and includes time to obtain additional measurements/samples, time to determine the derived values from the reference sample and the additional samples, and the like.

A component, such as the component 106, generates an information stream of data shown on another line and shown with reference number 203. The information stream 203 is generally a continuous stream of information from the component and includes a plurality of frames of data. For example, the information stream 203 can be from an analog sensor. In this example, the information stream 203 includes information related to an ABS wheel speed sensor in the form of ABS frames.

The information stream 203 can be provided on a bus or other suitable medium and is received by a control unit 104. The control unit is configured to store a current portion of the stream information in response to the reference frame 201. The current portion is stored within a buffer and is referred to as the stored portion 204. The stored portion 204 is shown along a portion of the graph labeled buffer data.

The stored portion 204 is a relatively small amount of data and covers a small duration of the information stream. In one example, the stored portion covers 3 to 5 ms of the information stream. In another example, the stored portion covers a selected number of frames or packets of the information stream. It is noted that a subsequent, unstored portion 208 of the information is not stored. In other approaches, such as those not utilizing a reference frame to determine the portion of the information stream coincident with the time trigger, this second portion would also need to be stored. This second portion could be as long as 1 second, in some examples.

The buffer can be a relatively small buffer due to the small size of the stored portion. The buffer can be implemented, for example, as the buffer 108 described above. Additionally, the buffer can be implemented as a ring buffer.

In one example where a ring buffer is employed, the buffer is sized for ABS data over the last 30 to 50 ms. Additionally, the component provides the ABS data on a bus every 10 ms, which requires a 40 ms buffer:

$$\frac{40\text{ ms}}{10\text{ ms}} * 4\text{ wheels} * 1\frac{\text{Byte}}{\text{wheel}} = 16\text{ Bytes}$$

The control unit generates correlated information on a line labeled CORRE INFO. The control unit generates the correlated information 206 in response to receiving the data frame 202. Here, the control unit retrieves the stored portion 204 and uses the stored portion 204 along with the second frame 202 to generate the correlated information 206. The control unit correlates the stored portion 204, which includes ABS data from the time of the time trigger 207, with the second frame 207, which include the phase information derived by the sensor.

The correlated information 206 can be provided on a bus, such as a vehicle system bus, and used to display information and the like. In one example, the correlated information 206 is used to display locations of the sensor and/or other sensors.

In other approaches of generating correlated information, time stamps are required along with a very large buffer that continuously stores ABS data. A sensor only transmits angle phase information and no reference frame is available or transmitted. Instead, the angle phase information is sent along with the duration of time that has elapsed since the reference sample was acquired. Thus, the large buffer is required to continuously store the ABS data and must be of sufficient depth to cover the sampling time and the processing time in the sensor to allow the controller to obtain the relevant ABS data. This increases the complexity and cost of generating the correlated information.

In contrast, the correlated information 206 is generated with a relatively small buffer because the second portion 208 is not stored. Further, time stamps and values are not required to be saved or used for searching. Instead, the stored portion 204 is ready to be used once the phase information present in the second frame 202 is received.

Figure 3:
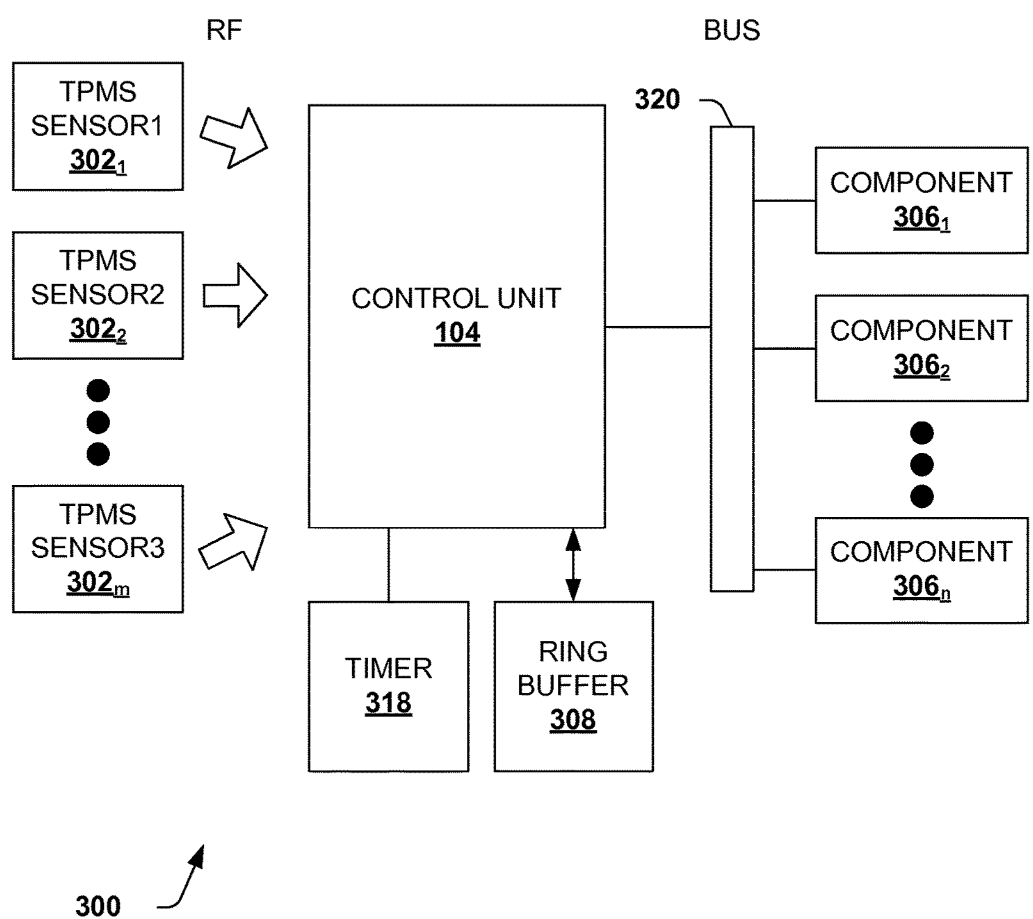
FIG. 3 is a diagram illustrating a vehicle system for correlating sensor information using TPMS sensors with a plurality of components.

FIG. 3 is a diagram illustrating a vehicle system 300 for correlating sensor information using TPMS sensors with a plurality of components. One or more information streams from the plurality of components are correlated with sensor information from a plurality of TPMS sensors to generate one or more correlated information/signals. The correlated signals are typically associated, one to one, with the plurality of components. The system 300 is described with reference to a vehicle to facilitate understanding; however it is appreciated that the system 300 and variations thereof can be used for other suitable applications as well.

The system 300 includes a plurality of TPMS sensors 302, a control/remote unit 104, a plurality of timers 318, a plurality of ring buffers 308, a vehicle bus 320, and one or more components 306. Generally, a separate buffer and timer are required for each sensor. The TPMS sensors 302 are located within or about the wheels of a vehicle. For example, a vehicle may have a front left (FL) wheel, a front right (RF) wheel, a rear left (RL) wheel and a rear right (RR) wheel.

The TPMS sensors 302, shown as $\mathbf{302}_1$ to $\mathbf{302}_m$ in FIG. 3, typically include a pressure or accelerometer sensor, a controller/processor and a wireless transmitter. The sensors 302 may also include a receiver for receiving control information, calibration information, and the like. The sensors 302 measure tire pressure directly or indirectly. If directly, the sensors include a pressure sensor that directly measures air pressure within a wheel.

In operation, generally, the sensors 302 measure a property and identify a reference sample or measurement. A reference frame or signal is transmitted by the sensor and received by the control unit 104. The reference frame may indicate an occurrence of the marked reference sample by the sensor. In response, the control unit 104 stores a portion of each of the information streams from the one or more components 306.

The sensors 302 may continue to measure the property and also derive one or more values from the sensors. For example, the TPMS sensors 302 can derive angle position or phase. A suitable technique, such as an algorithm, lookup table, and the like can be used. Once derived, the derived value(s) are transmitted by the sensors 302, typically as part of a data frame.

As discussed above, the +/−1 g modulation in the course of a tire rotation may be used to determine a rotation property of the tire. In some embodiments, the waveform, amplitude, frequency and phase of the +/−1 g ripple may be determined from the acceleration samples. One approach is to determine from the acceleration measurement samples a waveform, amplitude and frequency and thereafter determine the phase of the tire. The algorithm may determine or estimate the rotation property at the time of the time trigger from the acceleration measurement samples. In one embodiment, the determination is made less complex if one of the acceleration measurement samples corresponds to the time trigger, i.e. is measured at the time of the time trigger. However in general, the time trigger can be set at any point in the time within a respective measurement interval. In some embodiments the time trigger may correspond to the middle of a measurement time interval.

The one or more components 306 are shown individually as component $\mathbf{306}_1$, $\mathbf{306}_2$, . . . $\mathbf{306}_n$. Each of the components 306 can control or operate a different aspect of the vehicle system. For example, the component $\mathbf{306}_1$ may be an ABS system whereas the component $\mathbf{306}_2$ may be an air bag system and the component $\mathbf{306}_3$ is an electronic stability control system. Each component generates a component information stream. For example, the component $\mathbf{306}_1$ generates an ABS information/data stream.

The control unit 104 is remote from the sensors 302 and is also referred to as a remote unit. The unit 104 is configured to generate correlated information based on information at the time of the time trigger. The information includes sensor information and information of the information streams from the components at the relevant time of the time trigger. Because the derived sensor information is referenced to the time trigger (even though the calculation includes samples measured before and after the time trigger) and the information of the information stream is selected based on the receiving of the reference signal with only a short delay compared to the time trigger, correlation is possible. The small delay does not affect correlation since it is the same for all wheels. Thus, in response to the reference frame from one of the sensors 302, the control unit 104 stores a portion of the information streams from the components 306.

The stored portion may include some or all of the information streams and cover a relatively short duration of time. The portion is stored within one of the ring buffers 308, however other types of storage mechanisms can be used. The stored portion is relatively small because only a short period of time/duration of the information stream is stored.

In response to the derived values from the particular sensor that sent the time trigger, the control unit 104 uses the stored portion along with the derived values to generate the correlated information. In embodiments, correlated information is used to determine a wheel position, e.g. FL, FR, RL, and RR, for the sensor that sent the reference frame.

To provide a tire localization, information based on a sensing of a wheel axis rotation from each wheel axis by the fix installed wheel speed sensors close to a respective wheel axis is used. Typically wheel speed sensors sense magnetic field changes provided by encoder wheel having a plurality of magnetic poles, for example 40, distributed around the encoder wheel. Based on the sensing of poles passing the wheel speed sensor, the wheel speed sensor typically provides a signal edge which allows determining rotational speed and a coarse rotation position of the wheel axis. Portions of information from each wheel speed sensor can be correlated with the derived information from the tire pressure monitor sensors. In view of the receiving of the reference signal, the control unit is able to select and store for each wheel speed sensor the information which has been sensed by each wheel speed sensor at the time of receiving of the reference signal or close thereto. The wheel speed sensor whose stored information shows the best correlation may then be typically be chosen to correspond with the location of the tire pressure monitor sensor which then allows determining the location of the tire pressure sensor. It is to be understood that in order to obtain a reliable correlation, the above described process may be repeated multiple times.

In addition to sorting the stored portion of the information streams upon receiving a reference frame, the control unit 104 also uses a timer 318 to start a countdown. Generally, the derived values should occur within a selected period of time. If the derived values are not received within the selected period of time, one or more errors could have occurred, such as RF interference that prevented reception of the data frame. In such an event, the stored portion within the ring buffer 308 can be deleted and/or released for re-use.

Figure 4:
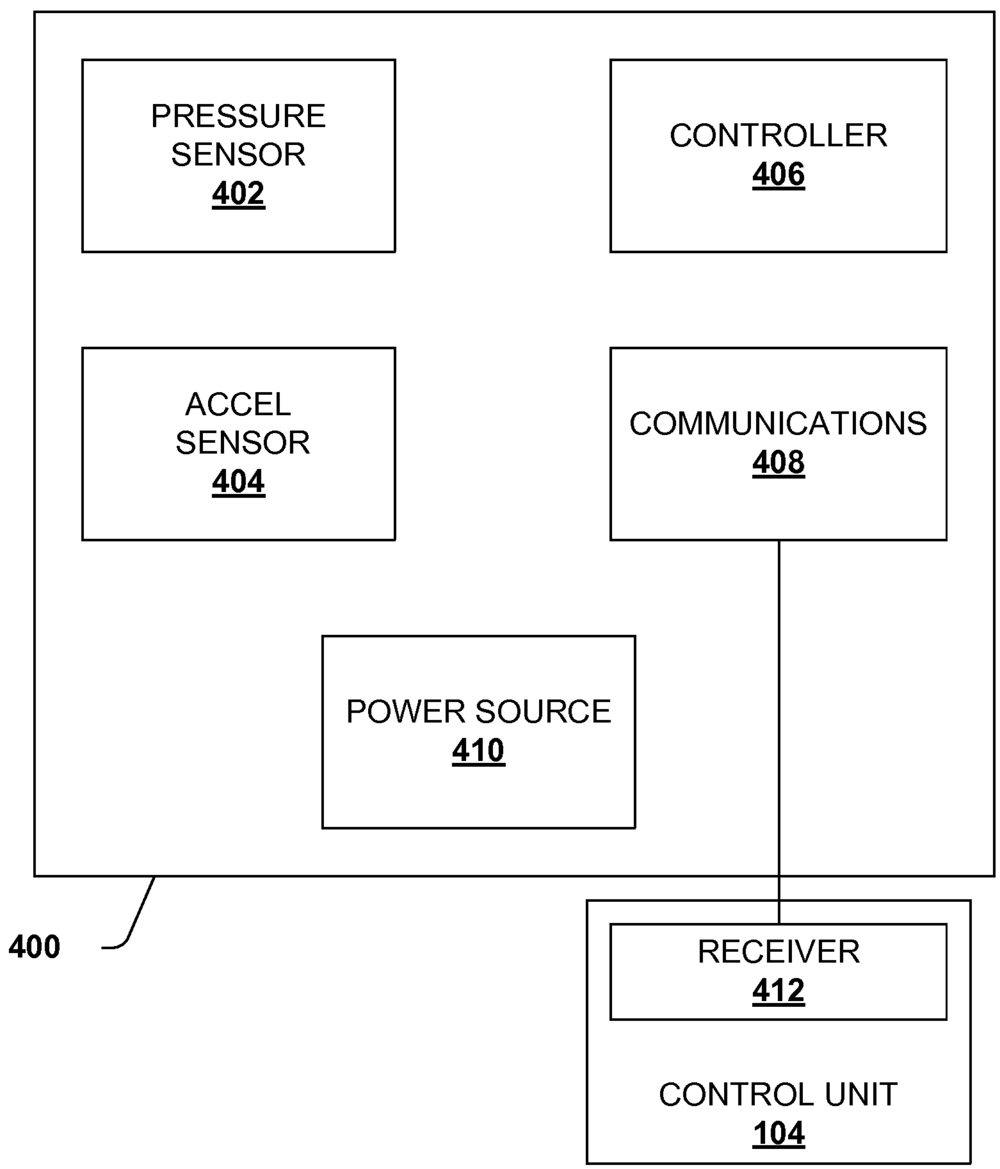
FIG. 4 is a diagram illustrating a sensor arrangement.

FIG. 4 is a diagram illustrating a sensor arrangement 400. The sensor arrangement 400 can be used, for example, as the sensor 102 described above. The sensor arrangement 400 can be used for tire pressure monitoring and the like and is described in terms of monitoring tire pressure for illustrative purposes. However, it is appreciated that the sensor arrangement 400 can be used for other suitable purposes.

The sensor arrangement 400 includes a pressure sensor 402, an acceleration sensor 404, a controller 406, a communications unit 408 and a power source 410. The pressure sensor 402 is configured to monitor pressure of a tire by periodically sensing the pressure. The acceleration sensor 404 provides acceleration measurements, which can be used to detect rotation. The acceleration sensor 404 typically operates only upon rotation and mitigates power consumption. The acceleration sensor 404 measures along a single axis in one example and measures along one or more axes in another example.

The communications unit 408, in this example, includes a radio frequency (RF) wireless transmitter in order to transmit sensor information. The communications unit may compress sensor information using a suitable technique. The communication unit 408 may also include a receiver for information, such as for calibration, control and the like.

The power source 410 supplies power to the components within the sensor arrangement. In one example, the power source includes one or more batteries.

A receiver 412 receives the sensor information from the sensor arrangement. The receiver 412 may decompress the received information using a suitable decompression technique that corresponds to the compression technique. The receiver 412 then provides the sensor information to a control unit 104.

The controller 406, also referred to as a processing unit, can include a processor and a memory and is connected to the other components of the arrangement 400. The controller 406 controls and performs operation of the pressure sensor 402, the acceleration sensor 404, the communications component 408 and the power source 410.

It is appreciated that variations of the arrangement 400 are contemplated including additional and/or omitting elements.

Figure 5:
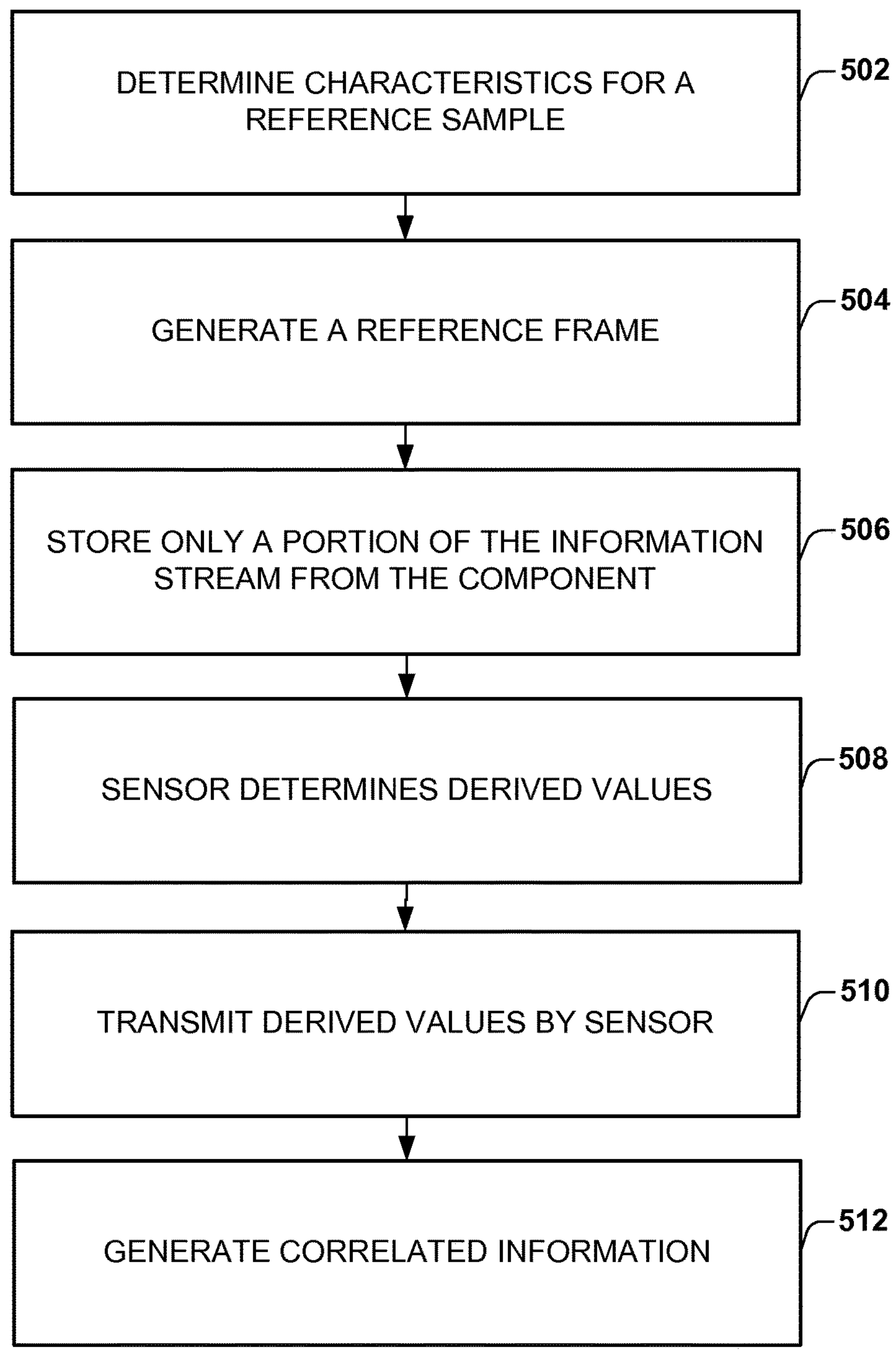
FIG. 5 is a flow diagram illustrating a method of operating a correlation system.

FIG. 5 is a flow diagram illustrating a method 500 of operating a correlation system. The method 500 can be performed in conjunction with and/or performed by the above systems and configurations and variations thereof.

The method begins at block 502, where characteristics for a reference sample are determined. In one example, the reference sample is one of many taken over an interval of measurements, such as the $11^{th}$ sample of 21 samples in a defined sampling period. In another example, the reference sample is a sample that exceeds a threshold value, matches a position/value, or another value. A sensor processing unit or control unit can be configured to determine the characteristics for the reference sample.

In an embodiment, the sensor generates a reference frame/signal upon obtaining the reference sample at block 504. The reference frame or reference signal is generated within a measurement period and is typically provided wirelessly. The reference frame, also referred to as a reference signal, indicates the timing or occurrence of the time trigger. The reference frame/signal includes information related to the identity of the sensor, a predefined code to indicate the occurrence of the time trigger and optionally other information such as the reference sample, previous measurements or samples, and the like. It is noted that it is not necessary to include a time stamp.

A control unit, also referred to as a remote unit, stores a portion of an information stream upon receiving the reference frame at block 506. The control unit is remote from the sensor Additionally, the reference frame indicates that the time trigger has occurred. The information stream includes data from one or more components or systems, such as an ABS component. The stored portion includes, in one example, a relatively short duration of time or snapshot of the information stream. The duration of time is relatively short, such as 1 to 2 ms. It is noted that data of the information stream prior or subsequent to the stored portion does not need to be stored.

The data can include control values, position information, measurements from other sensors and the like. The data can be particular to a particular system, such as a vehicle braking system or a vehicle steering system.

The control unit stores the information portion in a memory device, such as a buffer, associated with the sensor. Examples of a suitable buffer include a wrap around ring buffer. However, other suitable memory devices can be used. The memory device should be large enough to store the information portion. It is appreciated that other sensors and associated sensor buffers may also be present.

The sensor uses the reference sample and other measurement samples to determine derived values at block 508. The derived values include at least one rotation property of a tire. The sensor can use an algorithm, lookup table and/or other suitable mechanism to determine the one or more derived values. For example, an angle position sensor algorithm can be used to determine a phase of a wheel on a vehicle. The duration of time required for generating the derived information and obtaining the other measurement samples is referred to as processing time. The processing time can vary upon implementation and is also referred to as the measurement period. Typically, there is an upper limit on the processing time referred to as a processing threshold. If a processing error occurs, the derived information may not be generated within the processing threshold time.

The sensor wirelessly transmits the derived values at block 510. The derived values are typically transmitted within a data frame that is submitted subsequent to the first frame and is sent to the control/remote unit. The data frame is typically sent within the processing threshold time.

The control unit generates correlated information at block 512 in response to the transmitted derived values. The control unit is configured to obtain the stored portion from the memory device or buffer. The stored portion includes data relevant to the time at which the time trigger occurred. The derived values are also relevant to that time as well. Thus, the control unit is configured to use the derived values and the stored portion to correlate or generate the correlated information.

It is noted that if the derived value is not sent within the processing threshold time, an error may be assumed to have occurred. In the error condition, the control unit can perform a recovery response including, for example, ignoring the reference frame, and the like. If a transmission channel from the control unit to the sensor is available, a request for retransmission may be used.

In order to provide correlation, the method 500 and/or portions of the method 500 are repeated for subsequent sampling.

While the method is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

It is appreciated that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown in FIGS. 1, 2, etc., are non-limiting examples of system that may be used to implement the above methods). The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

A tire pressure monitor sensor is disclosed. The sensor includes a wireless transmitter and a processing unit. The processing unit provides a time trigger signal within a measurement period and triggers a wireless transmission of a reference signal indicating an occurrence of the time trigger signal to a remote unit. The tire pressure monitor sensor is configured to derive, based on a plurality of acceleration measurement samples within the measurement period, information indicting at least one rotation property of a tire. The tire pressure monitor sensor is further configured to wirelessly transmit the derived information to a remote unit separate from the reference signal.

A correlation system is disclosed. The system includes a sensor and a control unit. The sensor is configured to provide evidence of a time trigger as a reference frame and a derived value as a data frame. The control unit is configured to receive an information stream, store a portion of the information stream in response to the time trigger of the reference frame and to generate correlated information in response to the data frame. A second portion of the information stream subsequent to the first portion is not stored.

Another correlation system includes a plurality of sensors, a component and a control unit. The plurality of sensors include a first sensor at a first location and a second sensor at second location. The plurality of sensors are each configured to generate a time trigger as evidenced by transmission of a reference frame and derived information in a subsequent, data frame. The component is configured to generate an information stream of data. In one example, the data is related to a subsystem. The control unit is configured to receive the reference and data frames from each of the plurality of sensors, to receive the information stream and to generate correlation information including the first location and the second location.

A method of correlating information is disclosed. A plurality of measurement samples are analyzed by a sensor to identify a reference marker. The sensor transmits a reference frame that corresponds to the reference marker. A portion of an information stream is stored upon receiving the reference frame. A derived value is generated from the reference marker by the sensor. A data frame including the derived value is sent at a time subsequent to transmitting the reference frame. Correlated information is generated based on the derived value and the stored portion of the information stream.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A tire pressure monitor sensor comprising:

an accelerometer to perform acceleration measurements;

a processing unit to provide a time trigger signal within a measurement period and to trigger a wireless transmission of a reference signal indicating an occurrence of the time trigger signal to a remote unit, wherein the reference signal is based on measurement of a reference condition, wherein the measurement period is a duration of time to derive information;

wherein the tire pressure monitor sensor is configured to derive the information, based on a plurality of acceleration measurement samples within the measurement period and the reference signal, information indicating at least one rotation property of a tire; and wherein the tire pressure monitor sensor is further configured to wirelessly transmit the derived information to a remote unit separate from the reference signal.

2. The tire pressure monitor sensor of claim 1, further configured to derive the information by processing the plurality of acceleration measurement samples at least partially after the wireless transmission of the reference signal, wherein the derived information indicates the at least one rotation property at the time of the occurrence of the time trigger signal.

3. The tire pressure monitor sensor of claim 1, wherein the wireless transmission of the reference signal includes a wireless transmission of a reference frame, the reference frame further including a sensor identification.

4. The tire pressure monitor sensor of claim 1, wherein the time trigger signal correlates with a predetermined sample of the plurality of acceleration measurement samples.

5. The tire pressure monitor sensor of claim 1, wherein the tire pressure monitor sensor is configured to derive the information indicating at least one rotation property of the tire based on a gravity influence on the acceleration measured by the accelerometer.

6. The tire pressure monitor sensor of claim 1, wherein the at least one rotation property is an angular phase of the tire.

7. The tire pressure monitor sensor of claim 1, wherein the at least one rotation property is a rotation frequency of the tire.

8. The tire pressure monitor sensor of claim 1, wherein the processing unit is configured to determine a wake-up based on an acceleration measurement and to start the measurement period after the wake-up.

9. The tire pressure monitor sensor of claim 1, wherein a number of acceleration measurement samples within the measurement period is a predetermined number.

10. The tire pressure monitor sensor of claim 1, wherein the processing unit is configured to provide at least one further time trigger signal within a further measurement period and to trigger at least one further wireless transmission of a further reference signal indicating the occurrence of the further time trigger to a remote unit; and wherein the tire pressure monitor sensor is configured to further derive, based on a further plurality of acceleration measurement samples within the further measurement period, information indicating at least one rotation property of the tire at the time of the occurrence of the further time trigger signal and to wireless transmit the further derived information to the remote unit separate from the further reference signal.

11. The tire pressure monitor sensor of claim 1, wherein the at least one of the plurality of acceleration measurement samples is sampled prior to the occurrence of the time trigger signal and at least one of the plurality of acceleration measurement samples is sampled after to the occurrence of the time trigger signal.

12. The tire pressure monitor sensor of claim 11, wherein the reference signal includes at least one predefined code to indicate the occurrence of the time trigger signal.

13. The system of claim 1, wherein the control unit is further configured to obtain a portion of the derived information from a buffer, wherein the portion of the derived information is coincident with the time trigger.

14. A tire pressure monitoring system comprising:

a plurality of sensors including a first sensor associated with a first tire and a second sensor associated with a second tire, wherein the plurality of sensors are each configured to generate a reference frame indicating occurrence of a time trigger and generate derived information in a subsequent data frame, wherein the derived information is information indicative of a rotation property of the tire at the occurrence of the time trigger;

at least one component configured to generate an information stream related to at least a rotation of a first wheel axis associated with the first tire and a rotation of a second wheel axis associated with the second tire; and a control unit configured to receive the reference frames and data frames from each of the plurality of sensors, to receive the information stream and to determine a tire location of the first tire and a tire location of the second tire based on the reference frames, the data frames and a portion of information of the information stream.

15. The system of claim 14, wherein the information stream includes first information based on sensor information of a first wheel speed sensor mounted close to the first wheel axis and second information based on sensor information of a second wheel speed sensor mounted close to the second wheel axis.

16. The system of claim 15, wherein the control unit is configured to determine a tire location of the first and second tire based on a selection of a first portion of the first information and a selection of a second portion of the second information in response to a respectively received reference frame, wherein the first portion and the second portion are selected to be stored at least between the receiving of the reference frame and the subsequent data frame while other portions of the first information and second information are not selected to be stored.

17. The system of claim 16, wherein the control unit is configured to generate first correlation information based on a correlation of the selected first portion with derived information from a respective subsequent data frame and to generate second correlation information based on a correlation of the selected second portion with the derived information from the respective subsequent data frame and to further determine a location of the first and second tire based on the first correlation information and second correlation information.

18. The system of claim 14, wherein the control unit is configured to determine a release time of stored information from a buffer after a specific time period.

19. A method of operating a tire pressure management system, the method comprising:

generating a time trigger signal by a sensor within a measurement period and triggering wireless transmission of a reference signal to a remote unit;

generating a derived value by the sensor within the measurement period, wherein the derived value indicates at least one rotation property of a tire, wherein the measurement period is a duration of time to generate the derived value;

wirelessly transmitting the derived value to the remote unit subsequent to transmitting the reference signal;

storing a portion of an information stream from a component into a buffer based on receipt of the reference signal; and generating correlation information by the remote unit based on the stored portion and the derived value.

20. The method of claim 19, wherein generating the derived value is additionally based on a plurality of samples during the measurement period.

* * * * *